Patented May 13, 1952

2,596,843

UNITED STATES PATENT OFFICE 2,596,843

FRACTURING FORMATIONS IN WELLS

Riley F. Farris, Tulsa, Okla., assignor to Stanolind Oil and Gas Company, Tulsa, Okla., a corporation of Delaware No Drawing. Application December 31, 1949, Serial No. 136,395

23 Claims. (Cl. 166—21)

This invention pertains to the treatment of oil and gas wells. More particularly, this invention pertains to a method of increasing the productivity of an oil or gas well by providing lateral drainage channels in selected formations adjacent a well.

In the art of increasing the productivity of oil and gas wells, various methods have been proposed for increasing the drainage area within a selected producing zone. For example, nitroglycerin is detonated in a well in some cases to either enlarge the well diameter or fracture the formations immediately adjacent a well. The use of nitroglycerin in this art is, however, restricted in many cases due to the presence of pipe in the hole, the expense, the hazards, etc. Horizontal drilling is likewise employed to increase the surface area of a well in a selected zone. The increased productivity, however, is rarely commensurate with the increased cost. Furthermore, both of these processes are further limited by their inability to extend the drainage channels from ordinary diameter oil and gas wells an appreciable distance into the selected zone. Acidizing is sometimes practiced to increase the permeability of the formations adjacent a well, but this process is generally limited to use in calcareous formations.

Accordingly, it is an object of this invention to provide an improved method of completing wells. Another object of this invention is to provide a method of increasing the productivity of oil or gas wells. A further object of this invention is to provide a method of fracturing permeable formations in a well by the application of hydrostatic pressure. A more specific object of this invention is to provide an improved composition and method of employing this improved composition for fracturing producing formations, thereby increasing the permeability of the formations adjacent a well and consequently the productivity of a well. Still another object of this invention is to place rigid spacers or props in a fracture of a producing formation to maintain the permeability of the fracture.

In the present invention which is directed to an improvement in the above processes of increasing the productivity of a well one or more fractures are produced in the formation adjacent the well to open up low-permeability oil producing rock adjacent a well. These fractures are created by the application of hydrostatic pressure sufficient to crack the formation and lift the effective overburden. To produce a fracture I first place a low-penetrating fluid (as hereinafter defined) in the well opposite the zone to be fractured. Pressure is applied to the low-penetrating fluid or gel and, since it has a very retarded tendency to filter through the formation, pressure at the well walls builds up, and a fracture is produced in the formation, generally along a bedding plane where the tensile strength of stratified rock is weakest. This low-penetrating fluid or gel then being deleterious to the permeability of the fracture is removed, for example, by injecting a solvent or gel breaker for the fluid into the same fracture.

High hydrostatic pressures are required to fracture these formations. The high pressure pumps available are limited in their capacity; and, if the liquid pumped into the well has any appreciable rate of leakage into well formations, high pressure cannot be obtained. By the use of the low-penetrating fluids suitably in the form of gels, the rate of leakage is minimized, permitting adequate hydrostatic pressures to be produced in the well.

I have proved in the laboratory that when a fracture is created in a relatively impermeable core and the fracture is then closed, the permeability of the core is substantially increased. Laboratory data have been corroborated in wells where it has also been proved that the permeability may be further increased by the introduction of spacer materials or props such as sand, crushed shell, metal, or the like, with either the low-penetrating fluid or the solvent material. Preferably, however, I place the props or spacer objects in the low-penetrating fluid.

As used in this application, "low-penetrating fluid" is defined as a fluid which, with respect to the natural fluids in the well such as water or crude oil, has a considerably retarded tendency to filter through the formations. These fluids, in general, either have a greater viscosity than water or the average crude oil or they tend to plaster or produce a filter cake on permeable formations or they have both a high viscosity and tend to produce a filter cake on permeable formations. Well fluids have a viscosity at surface temperatures of less than 10 or 20 centipoises, usually about 1 or 2 centipoises. Viscosities are, of course, lower at formation temperatures. A low-penetrating fluid, in contrast, has a viscosity of from at least 30 centipoises to about 5,000 centipoises or higher. A viscosity range of from 75 to several hundred centipoises is preferred in the case of Newtonian liquids, or simple suspensions; i. e., those liquids in which the rate of shear is directly proportional to the shear stress. Liquids having higher viscosities can be employed, but their pumpability is lowered, increasing handling difficulties.

While viscosity is, in the case of Newtonian liquids, indicative of the formation penetrating qualities, the filter rate is a more precise measure of such qualities and is applicable to fluid suspensions of solids, or fluids containing plastering agents, as well as to Newtonian liquids. The preferred test of a low-penetrating fluid is therefore the filtrate rate. Filtrate rate is customarily defined as the volume of liquid collected in a unit time (normally 30 minutes) when a measured sample of liquid is placed in a cylinder closed at the bottom by a supported filter paper and a gas pressure is placed on this liquid. The sample is usually 600 cc., gas pressure 100 p. s. i., and Whatman No. 50 or 52 filter paper is used. The filtrate rate of oil-field brines and crude oils is usually so great that measurements at 30 minutes are meaningless. Accordingly, the filtrate rate in such cases is determined by the "dehydration time," where this is defined as the time required for air to blow through the cylinder and filter paper when 600 cc. of the fluid are placed in the cylinder at the start of the filtrate-rate test and a pressure of 100 p. s. i. is applied to the surface of the fluid. The "dehydration time" of ordinary crude oils and oil-field brines under formation conditions is of the order of 15–30 seconds. A low-penetrating fluid is defined under the same conditions as a fluid having a "dehydration time" of at least 1.5 minutes, and preferably at least 3 minutes or more. The filtration apparatus and procedure is described in A. P. I. Code No. 29, second edition, July 1942 (tentative). Usually this "dehydration time" will be too long to measure. A fluid loss of 100 cc. or less, preferably 50 cc. or less in 30 minutes, is desirable.

I prefer to provide a low-penetrating fluid by adding a bodying agent to a hydrocarbon fluid such as crude or refined oil. The bodying agent may comprise a colloid material or metallic soaps of organic acids; a high molecular weight olefin polymer, particularly high molecular weight linear polymers, such as polypropylene; and oil or water-soluble plastering agent, such as blown asphalt, or pitch. Thus, specifically I may employ a low-penetrating fluid comprising fuel oil, diesel oil, or the like containing blown asphalt or a benzene fraction containing dissolved pitch. Likewise, natural and synthetic rubber as well as resins such as the polyacrylates can be used as bodying agents for organic liquids whereby a fluid having low filtrate rate is produced.

The salts of fatty acids are in general suitable bodying agents for producing a suitable viscosity in the hydrocarbons. I may employ a metallic soap, preferably a hydroxy aluminum soap, bodying agent which has the ability to form hydrocarbon gels at ordinary temperatures. The term "hydroxy aluminum soap" refers to a soap wherein the hydroxy group or groups is associated with the aluminum component of the soap; in other words, this expression has the same meaning as is ascribed to it in U. S. 2,390,609. A suitable soap of this type can be considered as compounded from two distinct components. One is an aluminum laurate or a saturated fatty acid soap containing at least 40–50% of this substance or of a functionally related acid soap; this component is a relatively high-melting solid that, by itself, produces only thin and unstable gels. The second component is an aluminum soap or soaps selected from the group including soaps of cycloaliphatic and unsaturated acids—that is, an aluminum naphthenate, oleate, oleate-linoleate, or the like. The combination of an aluminum soap of the laurate type with one or more soaps of the naphthenate-oleate type gives a thickening or bodying agent of distinctive and superior properties not found in either component and when prepared by the precipitation process, a solid is produced which withstands ordinary handling and storing conditions and which is readily soluble in the oily liquid to produce a highly viscous liquid or gel. Gels of this type are commonly known as napalm gels and are described for example, in an article entitled "Napalm" in Ind. Eng. Chem., vol. 38, No. 8, August 1946, at pages 768–773. I have found that at about 75° F., for example, from about 3% to about 10% of this type of soap disperses in gasoline or crude oil in from about 15 seconds to about 10 minutes and that gels having a suitable filtrate rate and viscosity are produced within from about 30 seconds to about 20 minutes. While crude oil will disperse this soap, in general, more soap and more time is required to produce a crude oil-soap gel than a gasoline-soap gel having the same filtrate rate. Nevertheless, the crude oil-soap gels are, in general, more stable, i. e., do not break down as readily as gasoline-soap gels at high temperatures.

I have found that from about 0.5% to about 10% by weight relative to the oily liquid of this hydroxy aluminum soap, preferably between about 3% and about 6%, produces a suitable gel for fracturing most formations in accordance with this invention. Where the soap may be deteriorated, as by weathering, or contaminated, as by moisture, it is sometimes desirable to use even more than 10%. In accordance with the preferred embodiment of this invention, the oily liquid is weighed or otherwise measured, and the soap is added in a tank as the liquid is stirred. Sometimes the liquid may be heated to advantage to about 200–260° F. A flow type mixer for the soap and the oily liquid may be used at the well head with soap which reacts readily to produce a gel in the oily liquid. It has been found that the gel will develop in the well. Therefore, since the more viscous gels are difficult to pump, the soap-liquid dispersion may be introduced into a well before the maximum viscosity is reached.

Accordingly, when the gelation has proceeded to a point at which the viscosity is sufficient to maintain substantially all the particles of undispersed soap in suspension, the dispersion is ready to be pumped into the well. The gel may be placed in the well and injected immediately into the formation or it may be allowed to stand in the well until the maximum gelation has developed, as indicated by a sample retained at the surface. By this means, a fluid having low filtrate rate is available for producing the fracture where such fluid would not be pumpable by normal pumps.

While I prefer the use of organic low-penetrating fluids due to the fact that they tend selectively to enter an oil-producing formation and due to the fact that the oil-producing formations are not thus contaminated by deleterious, extraneous fluids, the invention is not limited to the use of such fluids and may be practiced with other low-penetrating fluids such as water containing bodying or plastering agents or the like.

This low-penetrating fluid or gelled fracturing liquid is in any case placed in a well, preferably through tubing, at the elevation of a producing formation. Packers may be and preferably are used to isolate and confine a section of the well which is to be fractured. Pressure is applied to the low-penetrating fluid either directly or indirectly by, for example, pumping another fluid into the well on top of the low-penetrating fluid, thereby building up a hydrostatic pressure at the producing formation great enough to cause the formations to part or fracture. The pressure required to part or fracture a formation in a well, hereinafter referred to as the "formation breakdown pressure," is roughly equivalent in pounds per square inch to the depth of the formation in feet. This pressure varies, however, from place to place, depending upon the depth and the nature of the formations, folding of the formations, and the like. I have found that the pressure required to fracture a formation is, in general, equal to the sum of the pressure required to overcome the rock-bonding strength and the pressure required to lift the effective overburden, which is normally much less than the weight per unit area of the overlying rock column. Obviously, the pressure required to overcome the rock-bonding strength is not necessarily dependent upon the depth of the rock and is, in general, quite variable. In deeper wells, however, the effect of the pressure required to overcome rock-bonding strength becomes relatively less important as compared with the pressure required to lift the effective overburden and therefore can generally be disregarded. As a general rule, the formation breakdown pressure in pounds per square inch divided by the depth in feet to which rupture or parting of the formation occurs, is reasonably constant at from about 0.57 to about 0.85 p. s. i. per ft. of depth at depths greater than about 4,000 ft. At shallower depths, the predominant effect is the rock bonding-strength, which is roughly 4,000 p. s. i. or less.

In any case, in accordance with this invention, it is necessary to apply at the elevation of the fracture a pressure equal to the formation breakdown pressure, and such a pressure is readily recognized. I have found in this respect that when pressure is applied to the formation, as above described, the pressure builds up as fluid is pumped at substantially constant rate into the well. Eventually, when low-penetrating liquids are used, the formation fractures, the pressure ceases to rise as fluid is injected and assumes a roughly constant value. Fluid pressure measurements at the surface at this time indicate that the formation breakdown pressure has been reached. Inasmuch as the pressure required to overcome the rock-bonding strength is small at great depths in comparison to the pressure required to lift the effective overburden, the pressure drop may be small when the formation breakdown pressure is reached. The formation breakdown pressure is therefore more accurately defined as the pressure at which an increase in rate of fluid injection into the formation will not materially increase the fluid pressure. It appears that after the fracture is initiated it may be extended radially for as much as 50 feet or more by the continued injection of low-penetrating fluid at the effective overburden pressure.

In operating at pressures less than the formation breakdown pressure, the fluid in the well merely filters through the formations, thus displacing the fluids therein; whereas, in operation in accordance with this invention, at pressures greater than the formation breakdown pressure, a fracture is produced in the formation and extended by the continued injection of fluid into the fracture.

This low-penetrating fluid may, in some cases, be preceded in the well by any fluid such as crude oil or, preferably, refined hydrocarbon fractions such as kerosene, gasoline, naphtha, or the like. These fluids tend to displace from the selected zone water and other contaminants which might otherwise be forced into oil-producing zones, thereby tending to decrease the permeability. Also, the low-penetrating fluid may be followed by a crude or refined oil or by an oil-soluble compound as a divider or separator, as hereinafter explained.

The low-penetrating fluid is followed generally either directly or indirectly by a solvent which, like the low-penetrating fluid, is injected into the formations at substantially the effective overburden pressure, thereby tending to follow the crevice or fracture produced by the low-penetrating fluid. This solvent may be injected into formations in any amount, but I normally inject a quantity between about one-half to about five times, preferably between about one-half and two-and-one-half times, the volume of the low-penetrating fluid. The solvent may consist of any of the well-known hydrocarbon solvents. Halogenated hydrocarbons, carbon tetrachloride, and carbon bisulfide are generally satisfactory. However, in some instances, I have found it preferable to use diluents or solvents adapted to a particular low-penetrating fluid. For example, where the low-penetrating fluid is made up of a hydrocarbon liquid containing a bodying agent such as petroleum tar, the solvent may be composed of hydrocarbons; or, where the low-penetrating fluid is made up of, for example, diluted pitch, the pitch may be removed from the formation after further dilution with benzines; or, where the low-penetrating fluid is a hydroxy aluminum soap, as above described, the solvent may be, for example, an amine or an oil-soluble sulfonate. The amine or oil-soluble sulfonate may be diluted with, for example, five or more volumes of a light hydrocarbon such as gasoline, kerosene, or naphtha. A "solvent," as the term is used herein, therefore includes any material which may be injected into a well either before or simultaneously with the low-penetrating fluid and which considerably increases the filtrate rate of the low-penetrating fluid after that fluid has entered the formation fracture.

According to my preferred process, a formation packer, either single or dual, is located and set in the well on the tubing to isolate and confine a selected producing zone which is to be fractured. The low-penetrating fluid is then prepared as above described; and pumped into the well. This fluid, when it reaches the formation which is to be fractured, tends to stay in the well and build up a high pressure due to its retarded tendency to penetrate the interstices of the formation. Some slight penetration of the formation interstices is sometimes considered desirable, since it is believed to assist in obtaining a fracture by increasing the area exposed to the high pressure, low-penetrating fluid. As pumping or injection of fluid into the well continues after the low-penetrating fluid reaches the selected formation, the bottom-hole pressure rises until the formation breakdown pressure is reached, a which time, as a general rule, the surface pressure decreases and continues at a substantially constant value. More low-penetrating fluid may be injected, extending the fracture.

As indicated above, sand or other formation props or spacer objects are preferably incorporated in the low-penetrating fluid as it is pumped into the well. These objects are, due to the high suspending force of the viscous low-penetrating fluid, carried back into the fracture with the low-penetrating fluid, where they are deposited when the low-penetrating fluid enters the formation or when the temporary suspending force of the low-penetrating fluid is broken. Relatively high volumes of sand can be employed, if desired. For example, it has been demonstrated that 10 pounds of 16-mesh sand may be added per gallon of viscous gel made of 5% hydroxy aluminum soap in gasoline, and can be pumped and handled in the well with comparative ease.

The low-penetrating fluid may then be followed by a filler or divider such as gasoline which tends to displace the low-penetrating fluid back into the fracture, thus requiring less low-penetrating fluid. For example, I may employ from about 50 to about 1,000 gallons or more of the low-penetrating fluid which is followed by gasoline or other filler in an amount unusually less than that of the low-penetrating fluid. Particularly in the case of low-penetrating fluids which contain suspended solids and produce an impervious sheath on the well wall and on the formations adjacent to the fracture, the filler appears merely to displace the low-penetrating fluid a substantial distance into the formation.

After the introduction of the filler or, in some cases, directly after the introduction of the low-penetrating fluid, the solvent, which is a diluent, peptizer, or gel breaker for the low-penetrating fluid, is introduced into the well through the tubing. This solvent tends to displace the low-penetrating fluid still further into the formations. When the solvent enters the formation fracture, the protective film produced by the low-penetrating fluid is solated, diluted, or dissolved, leaving a clean fracture or flow channel into the well. Where a formation prop such as sand is incorporated in either the low-penetrating fluid or the solvent, it will be deposited and remain in the fracture to increase the permeability of the channel. Inasmuch as the low-penetrating fluid tends to produce a thicker film adjacent the well than at remote points in the formation, the gel breaker or, generically, the solvent appears to remove this film substantially simultaneously over a wide area so that the fracture will be clean and highly permeable a substantial distance back into the producing formation. Inasmuch as the preferred low-penetrating fluids are generally at least partially crude oil- or water-soluble, contact with oil over extended periods of time tends to dissolve or otherwise displace the low-penetrating fluids from the formations. Consequently, a high permeability channel into the well, if not produced immediately by the solvent, will eventually be produced by the formation fluids. In some cases, due to this characteristic of the low-penetrating liquids to be liquefied by the interstitial fluids, it is unnecessary and more economical not to employ a solvent or viscosity reducer other than the interstitial fluids.

As an example of the effect of my invention on the operation of a Woodbine sand well, a well in the East Texas Field, which, on a production test prior to treatment in accordance with my invention, produced less than 1 barrel of oil per day with no water, was treated as follows:

The well had 3505 feet of 2-inch tubing with a formation packer located on the bottom. Total depth of the well was 3551 feet, and the open hole between the packer and total depth was 4¾ inch diameter. A fracturing liquid was made up by adding 6% (by volume) of aluminum soap, as above described in the preferred embodiment, to 23 barrels of East Texas crude oil. The soap was added to the crude oil while the crude oil was agitated. The crude oil was at a temperature of about 73° F. Agitation was continued for an hour, at which time the viscosity was approximately 200 centipoises on the Stormer viscosimeter operating at 600 R. P. M. The filtrate rate was about 20 cc. in 30 minutes. When the viscosity of the fracturing liquid reached 200 centipoises, injection into the well at the rate of 4.68 barrels per minute was started with 160 lbs. of 16-mesh screened plaster sand being mixed into the fracturing liquid at the pump suction at a uniform rate of about 0.15 lb. of sand per gallon of low-penetrating fluid. After the fracturing liquid had been injected into the tubing, it was followed immediately by two barrels of East Texas crude oil for the purpose of separating the fracturing liquid from the gel breaker, which then followed immediately at substantially the same injection rate. This gel breaker, which had been compounded before injection of the fracturing liquid started, consisted of 24 barrels of gasoline containing 35 gallons of 60% oil-soluble sulfonates and 40% aromatic petroleum solvents. Immediately following the gel breaker solution, 25 additional barrels of East Texas crude oil were pumped into the well to displace the gel breaker from the tubing and the well into the formation. The formation breakdown pressure was approximately 3400 p. s. i., and the pressure dropped thereafter to the effective overburden pressure which approximately 2700 p. s. i. After the crude oil was injected, the well was allowed to stand idle for 48 hours to permit a substantial reduction in the viscosity of the fracturing liquid. On a production test which followed immediately, the well pumped about 5 centipoises crude oil at the rate of approximately 70 barrels per day. Inasmuch as 122 barrels of fluid had been pumped into the well, the initial production obviously included the injected liquids. However, the sustained production (pumping) was at the rate of 50 barrels of oil per day, with no water. Examples of other successful treatments are given in Table I.

*Table I*

| Field | Depth to Zone of Fracture | Formation Breakdown Pressure, p. s. i. | Gallons of Fracturing Liquid | Production Bbl. per day— | |
|---|---|---|---|---|---|
| | | | | Before | After |
| Frannie Field, Wyoming. | 3,025–3,146 | 1,850 | 900 | 60 | 160 |
| E. Sasakwa Field, Oklahoma. | 2,717–2,752 | 2,050 | 1,000 | 0 | 6 |
| Rangely Field, Colorado. | 5,890–6,250 | 4,900 | 800 | 75 | 140 |

In these wells, the volume of gel breaker used was roughly twice the volume of fracturing fluid. Sand was used at the rate of 0.15 to 0.2 pounds of 16-mesh sand per gallon of fracturing fluid. Packers were used to confine the length of zone of open hole to which the hydraulic pressure was applied to the figures given.

This invention, in addition to the production of a fracture in a formation as disclosed above, is highly useful in a number of other respects. I have found, for example, that it is particularly adaptable to combination with the acidization of producing formations. More particularly, I have found that in most calcareous formations it is impossible to obtain the formation breakdown pressure with acid solutions, and therefore the acid merely filters through the permeable strata immediately adjacent the well. Deep channels to the well are not produced under such circumstances. I therefore, prior to acidization of such formations, inject a low-penetrating fluid into the formation, according to the above-described procedure. Following the low-penetrating fluid, either directly or indirectly, an acid solution, either alone or in combination as by emulsification with a suitable solvent, is pumped into the fracture—the procedure being the same as that described for the injection of a solvent in the preferred embodiment. That is, I have found that acid solutions, particularly strong mineral acid solutions, break down the gels and the surface films produced by a number of the low-penetrating fluids, particularly the fluids containing amylaceous colloids or soaps. Only in cases where the action of the acid solution is slow, is it desirable to emulsify another solvent with the acid. In all these cases, however, sufficient acid is employed not only to destroy the gel and/or the surface film produced by the low-penetrating fluid but to react with the calcareous formation, thereby tending to increase the permeability in and adjacent to the fracture.

Thus, it will be apparent that my invention is susceptible of a great variety of embodiments, and therefore the invention is not to be construed to be limited to the above-described embodiments.

This is a continuation-in-part of my abandoned application Serial No. 29,922, filed May 28, 1948. Certain subject matter disclosed herein is disclosed and claimed in U. S. application Serial No. 136,394 Clark, filed December 31, 1949, which is a continuation-in-part of U. S. application Serial No. 29,932 Clark, filed May 28, 1948. Related subject matter is also disclosed and claimed in U. S. application Serial No. 77,426 Fast, filed February 19, 1949.

I claim:

1. A method of increasing the fluid productivity of a formation penetrated by a well, which method comprises pumping a low-penetrating fluid into a confined zone in said well including said formation, said low-penetrating fluid possessing an initial dehydration time of at least one and one-half minutes in the apparatus described in A. P. I. Code No. 29, Second Edition, July 1942 (Tentative), where dehydration time is defined as the time required to filter 600 cc. of said fluid at 100 p. s. i. pressure differential, the dehydration time of said low-penetrating fluid decreasing upon continued contact with formation fluids, said low-penetrating fluid being pumped into said confined zone under increasing pressure until the pressure of the liquid at said formation is between about 0.57 and 0.85 pounds per square inch per foot of depth to said confined zone and until an increase in rate of fluid injection into said well causes no substantial increase in said fluid pressure at the surface, and then maintaining said low-penetrating fluid in said formation in contact with said formation fluids for a period of hours sufficient to decrease the dehydration time thereof.

2. The method of increasing the productivity of a formation penetrated by a well, which method comprises introducing low-penetrating fluid into a confined zone of said well, pumping additional fluid into the well as a follower for said low-penetrating fluid in said confined zone at a rate sufficient to increase the pressure exerted in said confined zone by said low-penetrating fluid until a formation fracture is indicated by a decrease in resistance to flow of said low-penetrating fluid into said formation, continuing the pumping of said low-penetrating fluid into said formation after a fracture is indicated to displace at least a part of said low-penetrating fluid into passages formed in the formation, contacting said low-penetrating fluid and a solvent therefor in an amount and for a time sufficient to reduce substantially the viscosity of said low-penetrating fluid in said passages and thereby prevent clogging of said passages and producing said well to remove the liquid of reduced viscosity from said passages.

3. A method of increasing the productivity of a formation penetrated by a well, comprising disposing in a confined zone in said well adjacent said formation a low-penetrating fluid having a viscosity greater than 30 centipoises at 20° C. applying a pressure to said fluid sufficient to fracture said formation and to displace at least a part of said fluid into said formation, contacting said low-penetrating fluid and a solvent therefor in an amount and for a time sufficient to reduce substantially the viscosity of the liquid in said passages and thereby prevent clogging of said passages and withdrawing the liquid of reduced viscosity from the passages by removing liquids from said well.

4. The method of treating a well to increase the productivity of a formation penetrated by the well through fracturing the formation which comprises placing a low-penetrating liquid into a confined zone in said well including said formation, said low-penetrating liquid comprising a gel and possessing a dehydration time of at least 1.5 minutes, increasing the pressure on the low-penetrating liquid in said confined zone until the pressure of the liquid at the elevation of said formation is between about 0.57 and 0.85 pounds per square inch per foot of depth from the surface to said zone and until an increase in rate of fluid injection into said well will not materially increase the fluid pressure, contacting said liquid with a solvent to decrease substantially the dehydration time of said liquid, and producing said well.

5. A method according to claim 4 in which said low-penetrating fluid contains granular spacer material insoluble in formation fluids.

6. A process of treating a well to increase the productivity of a formation penetrated by the well through fracturing the formation, which process comprises pumping a low-penetrating liquid into a confined zone in said well including said formation, said low-penetrating liquid including a gel-forming colloidal agent and possessing a dehydration time of at least 1.5 minutes, the low-penetrating liquid being pumped into the confined zone with progressively increasing pressure, said pumping being continued until and beyond the point where, at a pressure of the liquid against the formation of between 0.57 and 0.85 pounds per square inch per foot of depth of the confined zone, the pressure ceases to rise with continued pumping, and thereafter continuing pumping to displace at least part of said low-penetrating liquid into said formation, substantially decreasing the gel strength of said low-penetrating liquid, and producing said well.

7. A method of treating a well to increase the productivity of a formation penetrated by the well which comprises pumping a low-penetrating liquid into a confined zone in said well including said formation, said low-penetrating liquid containing a gel-forming colloid and possessing a dehydration time of at least 1.5 minutes and being capable of becoming less viscous on prolonged contact with an interstitial liquid, pumping said low-penetrating liquid into the confined zone until a formation breakdown pressure is reached, continuing pumping to displace low-penetrating fluid into passages in said formations, thereafter maintaining said liquid in said passages until the filtrate rate of said low-penetrating liquid is substantially increased and producing said well, whereby said liquid is removed from said passages.

8. The method of increasing the fluid productivity of a formation penetrated by a well, which method comprises introducing into said well a pumpable fracturing liquid compatible with said fluid and a sufficient amount of colloidal material to effect gelation of the fracturing liquid and thus prevent its rapid penetration into pores in the formation, pumping the gelled fracturing liquid as a column down the well until the low part of the column is in contact with the formation, pumping additional fluid into the well above the column at a rate sufficient to increase the pressure exerted at said formation by said liquid until a formation fracture is indicated by a decrease in the resistance to fluid flow into said well, continuing the pumping after indication of fracture to displace at least part of said gelled fracturing liquid from the column into passages formed in the formation, adding a solvent to said gelled fracturing liquid to reduce substantially the viscosity thereof in said passages and prevent clogging of said passages, and withdrawing fracturing liquid of reduced viscosity by removing liquids from said well.

9. The method of increasing the fluid productivity of a formation penetrated by a well, which method comprises introducing into the well a pumpable fracturing liquid compatible with said fluid, which fracturing liquid has a viscosity greater than 30 centipoises at 20° C. and which fracturing liquid has a dehydration time of at least one and one-half minutes in the apparatus described in A. P. I. Code No. 29, Second Edition, July 1942 (tentative), where dehydration time is defined as the time required to filter 600 cc. of said liquid at 100 p. s. i. pressure differential, pumping said fracturing liquid into the well as a column until a part thereof is in contact with the formation, pumping additional fluid into the well as a follower for said column at a rate sufficient to increase the pressure exerted at the formation until a formation fracture is indicated by a decrease in the pressure at the pump discharge while pumping at an undiminished rate, continuing the pumping after indication of the fracture to displace at least a part of the fracturing liquid from the column into passages formed in the formation, contacting said fracturing liquid and a solvent therefor in an amount and for a time sufficient to reduce substantially the viscosity of the liquid in said passages and thereby prevent clogging of said passages and withdrawing the liquid of reduced viscosity from the passages by removing liquids from said well.

10. The method of claim 9 wherein granular spacer material insoluble in formation fluids is added to the fracturing liquid, so that said material is carried thereby into said passages and remains in said passages when the liquid of reduced viscosity is withdrawn therefrom.

11. The method of claim 9 wherein said solvent is pumped into the formation ahead of the fracturing liquid.

12. The method of claim 9 wherein said solvent is pumped into the well after the fracturing liquid is introduced thereinto.

13. The method of claim 9 which includes the step of pumping an acid capable of reacting with said formation into said passages formed in the formation, after the fracturing liquid is introduced into said well.

14. The method of increasing the fluid productivity of a formation containing an interstitial liquid and penetrated by a well, which method comprises introducing into the well a pumpable organic fracturing liquid and a gel-forming material for converting the organic liquid to a low-penetrating fluid comprising a gel, maintaining said organic liquid and said material in contact until there is at least partial transformation of said organic liquid into a gel before it is positioned in contact with the formation, forcing the resulting gel down the well by continued pumping until a part of the column of said gel is in contact with the formation, pumping additional fluid into the well as a follower for said column at a rate sufficient to increase the pressure exerted at the formation by said gel until a formation fracture is indicated, continuing the pumping after indication of fracture to displace at least a part of the gel from the column into passages formed in the formation, contacting said gel and a solvent therefor to cause reversion of the low-penetrating fluid in said passages to a low-viscosity liquid and thereby prevent clogging of said passages, and withdrawing said low viscosity liquid and solvent from said passages by removing liquids from said well.

15. The method of claim 14 wherein the gel-forming material is a oleophilic colloid.

16. The method of claim 14 wherein the solvent consists of said interstitial liquid contained in said formation.

17. The method of claim 14 which includes the step of introducing a solvent as at least a portion of said follower.

18. The method of claim 14 which includes the steps of adding granular spacer material insoluble in formation fluids to the gel, whereby said spacer material is carried into said passages by said gel, and remains in said passages when the low-penetrating fluid reverts to low viscosity liquid form and is withdrawn from the passages.

19. The method of increasing the fluid productivity of a formation penetrated by a well, which method comprises placing at least one packer in said well to confine a zone in said well including said formation from other portions of said well, introducing into said well a pumpable fracturing liquid and sufficient gel-forming material for converting the liquid to a gel of such consistency that sand can be suspended therein, pumping the resulting gel as a column down the well, pumping additional fluid into the well as a follower for said column at a rate sufficient to force said column into said zone and to increase the pressure exerted in said zone at the formation by said gel until a formation fracture is indicated by a decrease in pressure at the pump outlet while pumping at an undiminished rate, continuing the pumping after indication of fracture to displace at least a part of the gel from said column into passages formed in the formation, adding a solvent to said gel to cause thinning of the gel in said passages to a non-viscous liquid and thereby prevent clogging of said passages, and withdrawing said non-viscous liquid from the passages by removing liquids from said well.

20. The method of claim 19 which includes the step of adding sand to the fracturing liquid and gel-forming material introduced into the well whereby said sand is suspended in said gel and carried thereby into said passages and is deposited in said passage when the gel reverts to fluid form and is withdrawn from the passages.

21. A method of increasing the productivity of a formation penetrated by a well comprising disposing in a confined zone in said well adjacent said formation a suspension of spacer objects in a low-penetrating fluid, applying hydrostatic pressure to said suspension sufficient to fracture said formation and displace said suspension into said formation, and then injecting into said fracture at said formation breakdown pressure a solvent for said low-penetrating fluid whereby said spacer objects are deposited in said fracture to increase the permeability of said channel to interstitial fluids when said low-penetrating fluid is dissolved by said solvent.

22. A method of increasing the hydrocarbon productivity of a formation penetrated by a well comprising disposing in a confined zone of said well isolated by at least one packer from the remainder of said well, a suspension of sand in a low-penetrating fluid which is compatible with the fluid to be produced by the well, applying a hydrostatic pressure to said suspension as great as the formation breakdown pressure to displace said suspension into a fracture in said formation, and then injecting a solvent for said low-penetrating fluid into said fracture to decrease the viscosity thereof and deposit said sand in said fracture whereby a highly-permeable channel is extended from said well a substantial distance into said formation.

23. A method of increasing the hydrocarbon productivity of a formation penetrated by a well comprising injecting a low-penetrating fluid into a confined zone of said well, said low-penetrating fluid consisting of a suspension of sand in a solution of blown asphalt in a liquid which is compatible with the hydrocarbon to be produced by the well, applying a hydraulic pressure to said low-penetrating fluid sufficient to fracture said formation and displace said low-penetrating fluid into the fracture, and following said low-penetrating fluid with a solvent for said fluid whereby a permeable channel is produced in said formation.

RILEY F. FARRIS.

REFERENCES CITED

The following references are of record in the file of this patent:

UNITED STATES PATENTS

| Number | Name | Date |
|---|---|---|
| 2,264,353 | Zimmer et al. | Dec. 2, 1941 |
| 2,300,325 | Leeuwen | Oct. 27, 1942 |
| 2,332,822 | Williams | Oct. 26, 1943 |
| 2,354,570 | Benckenstein | July 25, 1944 |
| 2,379,516 | Garrison | July 3, 1945 |
| 2,380,893 | Zimmer et al. | July 31, 1945 |
| 2,390,609 | Minich | Dec. 11, 1945 |
| 2,447,064 | Gebhart et al. | Aug. 17, 1948 |
| 2,458,034 | Swenson et al. | Jan. 4, 1949 |
| 2,477,296 | Georgi | July 26, 1949 |
| 2,491,641 | Bondi | Dec. 20, 1949 |

OTHER REFERENCES

Torrey, P. D., "Selective Exclusion of Fluids from Wells," The Oil Weekly, pages 26 to 35, May 22, 1939.